United States Patent
Islam et al.

(10) Patent No.: US 9,444,905 B2
(45) Date of Patent: Sep. 13, 2016

(54) ALLOCATING NETWORK BANDWIDTH TO PREFETCH REQUESTS TO PREFETCH DATA FROM A REMOTE STORAGE TO CACHE IN A LOCAL STORAGE

(71) Applicant: International Business Machines Corporation, Armonk, NY (US)

(72) Inventors: Shah Mohammad R. Islam, Tucson, AZ (US); John T. Olson, Tucson, AZ (US); Sandeep R. Patil, Pune (IN); Riyazahamad M. Shiraguppi, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 141 days.

(21) Appl. No.: 14/221,224

(22) Filed: Mar. 20, 2014

(65) Prior Publication Data

US 2015/0271287 A1   Sep. 24, 2015

(51) Int. Cl.
*H04L 29/08* (2006.01)
*G06F 12/08* (2016.01)

(52) U.S. Cl.
CPC .......... *H04L 67/2847* (2013.01); *H04L 67/06* (2013.01); *G06F 12/0862* (2013.01)

(58) Field of Classification Search
None
See application file for complete search history.

(56) References Cited

U.S. PATENT DOCUMENTS

| 5,559,984 A * | 9/1996 | Nakano .................. G06F 12/122 707/999.002 |
| 5,925,100 A | 7/1999 | Drewry et al. |
| 6,023,726 A | 2/2000 | Saksena |
| 6,701,316 B1 * | 3/2004 | Li ..................... G06F 17/30902 370/395.41 |
| 7,711,797 B1 | 5/2010 | Huang |
| 8,204,907 B1 * | 6/2012 | Smith ............... G06F 17/30091 707/705 |
| 8,326,923 B1 | 12/2012 | Szabo et al. |
| 2001/0003830 A1 * | 6/2001 | Nielsen ............... H04L 12/5695 709/226 |
| 2004/0252698 A1 * | 12/2004 | Anschutz .............. H04L 47/785 370/395.21 |
| 2012/0096144 A1 * | 4/2012 | Ledlie ..................... H04L 12/56 709/224 |
| 2014/0280485 A1 * | 9/2014 | A Hummaida ..... H04L 67/2847 709/203 |

FOREIGN PATENT DOCUMENTS

WO    2008138008    11/2008

OTHER PUBLICATIONS

J. Griffioen, et al., "Automatic Prefetching in a WAN", IEEE, 1993 pp. 5.

(Continued)

*Primary Examiner* — Midys Rojas
*Assistant Examiner* — Jane Wei
(74) *Attorney, Agent, or Firm* — David W. Victor; Konrad Raynes Davda & Victor LLP

(57) ABSTRACT

Provided are a computer program product, system, and method for allocating network bandwidth to prefetch requests to prefetch data from a remote storage to cache in a local storage. A determination is made of access rates for applications accessing a plurality of files, wherein the access rate is based on a rate of application access of the file over a period of time. A determination is made of an access rate weight for each of the files based on the access rates of the plurality of files. The determined access rate weight for each of the files is used to determine network bandwidth to assign to access the files from the remote storage to store in the local storage.

23 Claims, 6 Drawing Sheets

(56) References Cited

OTHER PUBLICATIONS

J. Griffioen, et al., Reducing File System Latency Using a Predictive Approach, 1995, pp. 11.

"WAN Optimization Technologies in EMC Symmetrix Replication Environments", EMC2, White Paper, Jan. 2009, pp. 11.

"A Novel Data Prefetch Method Under Heterogeneous Architecture", IP.com, IP.com #IPCOM000224167D, Dec. 2012, pp. 14.

Seema, et al., "An Approach to Improve the Web Performance by Prefetching the Frequently Access Pages", International Journal of Advanced Research in Computer Engineering and Technology, vol. 1, Issue 4, Jun. 2012, pp. 10.

Svobodova, "File Servers for Network-Based Distributed Systems", Computing Surveys, 1984, 16(4), 353-398.

* cited by examiner

File Access Information

Class Information Instance

Prefetch Request

ALLOCATING NETWORK BANDWIDTH TO PREFETCH REQUESTS TO PREFETCH DATA FROM A REMOTE STORAGE TO CACHE IN A LOCAL STORAGE

BACKGROUND OF THE INVENTION

1. Field of the Invention

The present invention relates to a computer program product, system, and method for allocating network bandwidth to prefetch requests to prefetch data from a remote storage to cache in a local storage.

2. Description of the Related Art

Enterprises operating at geographically dispersed sites may utilize an infrastructure for moving, storing and accessing large amounts of data across geographically distributed sites. The International Business Machines Corporation ("IBM") General Parallel File System ("GPFS") allows for the caching of data stored in a remote storage at a local storage cache site for use by applications at the local site. GPFS provides tools for management and administration of the GPFS cluster and allows for shared access to file systems from remote GPFS clusters. Panache is a scalable, high-performance, file system caching layer integrated with the GPFS cluster file system that provides a persistent data store at the local cache site which masks wide area network ("WAN") latencies and outages by using GPFS to cache massive data sets, allowing data access and modifications even when the remote storage cluster is unavailable.

In the Panache system, a home site is a source of original data and a cache site caches data locally in a persistent store for local client applications. When a client application accesses any file, for a first access, the file is fetched from the home site and copied to the GPFS file system at the cache site. Subsequent requests for the file are served from the local cache site eliminating the need of WAN bandwidth. The Panache system maintains data synchronization and consistency between the cache site and the home site copy.

If a client application file access request at the local site results in a cache miss, the reading of the file data from the home-site over WAN can result in significant latency for the applications accessing data. To reduce latency, Panache provides a partial file caching feature, which allows the prefetching of a file on demand basis. If the application has requested a file percentage that exceeds a prefetch threshold, a background prefetch operation may be triggered on the file to copy the file from the home site to the cache site to make available for future application access without network latency.

SUMMARY

Provided are a computer program product, system, and method for allocating network bandwidth to prefetch requests to prefetch data from a remote storage to cache in a local storage. A determination is made of access rates for applications accessing a plurality of files, wherein the access rate is based on a rate of application access of the file over a period of time. A determination is made of an access rate weight for each of the files based on the access rates of the plurality of files. The determined access rate weight for each of the files is used to determine network bandwidth to assign to access the files from the remote storage to store in the local storage.

DETAILED DESCRIPTION

Described embodiments provide for efficient utilization of network bandwidth for prefetch data traffic based on the application access rates of files and the customer class assigned to applications accessing the files. An access rate weight may be calculated for a file to prefetch based on the application access rate of the file to prefetch and the access rates for other prefetch requests to allocate network bandwidth based on a relative application access rate, such that applications accessing files at a higher rate are allocated a relatively higher network bandwidth for prefetch operations. Further, the customer class allocated to the applications may be used to determine the amount of the available prefetch network bandwidth to allocate to a prefetch request to favor applications assigned to a higher quality customer class.

Figure 1:
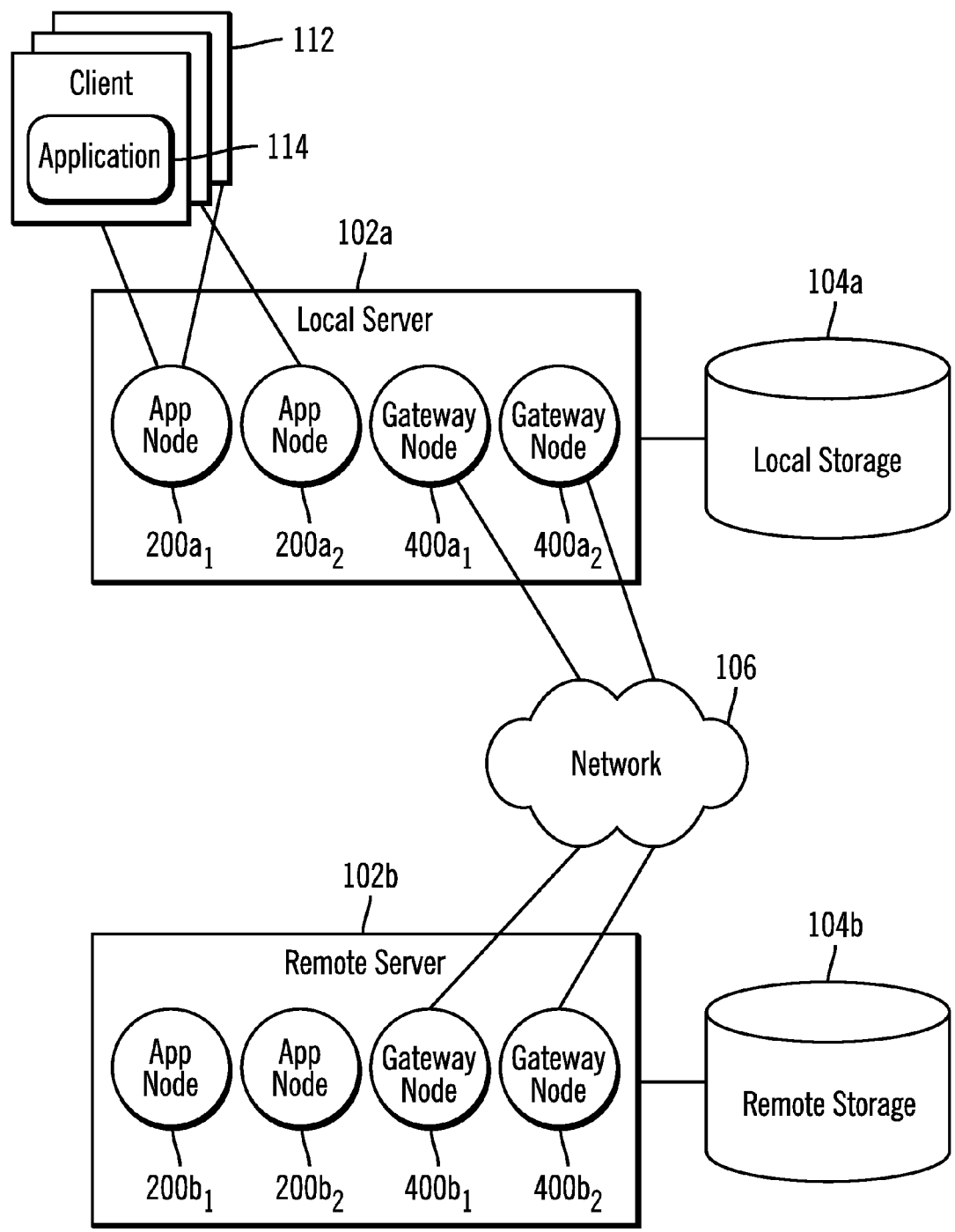
FIG. 1 illustrates an embodiment of a network storage environment.

FIG. 1 illustrates an embodiment of a network storage environment including a local server 102a having a local storage 104a to cache data accessed over a network 106 from a remote storage 104b managed by a remote server 102b. Application nodes 200a₁, 200a₂ at the local server 102a receive application requests from applications 114 in clients 112 coupled to the application nodes 200a₁, 200a₂ for data at the remote storage 104b. The requested data may be retrieved from the local storage 104a if cached there. If requested data is not cached at the local storage 104a, then gateway nodes 400a₁, 400a₂ at the local server 102a support remote network connectivity to retrieve requested data from the remote storage 104b by communicating with remote gateway nodes 400b₁, 400b₂ to retrieve or prefetch data from the remote storage 104b in order to cache at the local storage 104a. The remote server 102b may also include application nodes 200b₁, 200b₂ for servicing application requests at the remote site.

Although only two application 200a₁, 200a₂, 200b₁, 200b₂ and gateway 400a₁, 400a₂, 400b₁, 400b₂ nodes are shown at each site, there may be any number of application and gateway nodes at the local 102a and remote 102b servers, also referred to as cache clusters. The split between application and gateway nodes is conceptual and any node in the cache cluster can function both as a gateway node or an application node based on its configuration. The gateway nodes can be viewed as the edge of the cache cluster that can communicate with the remote cluster while the application nodes interface with the application. The applications 200a₁, 200a₂ and 200b₁, 200b₂ communicate with the gateway nodes 400a₁, 400a₂ and 400b₁, 400b₂, respectively, using internal requests in the local 102a and remote 102b servers.

The applications 114 executing in the clients 112 may be assigned to operate at different quality of service (QoS)

customer classes, e.g., gold, silver, bronze, etc., which indicate an amount of network 106 bandwidth that will be allocated to requests from the applications 114. For instance, a certain amount of the network 106 bandwidth may be assigned to each customer class, where higher QoS classes receive a higher percentage of the assigned allocations. Application requests within a customer class will then divide the network 106 bandwidth allocated to that class.

The storages 104a and 104b may each comprise one or more storage devices known in the art, such as interconnected storage devices, where the storage devices may comprise hard disk drives, solid state storage device (SSD) comprised of solid state electronics, such as a EEPROM (Electrically Erasable Programmable Read-Only Memory), flash memory, flash disk, Random Access Memory (RAM) drive, storage-class memory (SCM), etc., magnetic storage disk, optical disk, tape, etc.

The network 106 may comprise a network such as one or more interconnected Local Area Networks (LAN), Storage Area Networks (SAN), Wide Area Network (WAN), peer-to-peer network, wireless network, etc.

Figure 2:
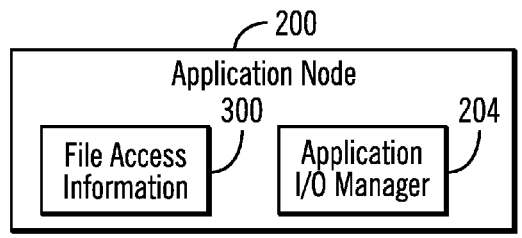
FIG. 2 illustrates an embodiment of an application node.

FIG. 2 illustrates an embodiment of components in an application node 200, such as one of application nodes $200a_1$, $200a_2$, $200b_1$, $200b_2$ as including file access information 300 having information on files requested by the applications 114 submitting read and write requests to the application node 200 and an application Input/Output (I/O) manager 204 to manage the read and write requests from the applications 114 for data at the remote storage 104b that may be cached in the local storage 104a.

Figure 3:
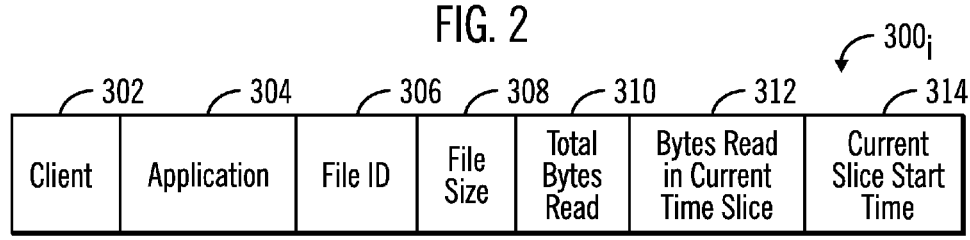
FIG. 3 illustrates an embodiment of file access information.

FIG. 3 illustrates an embodiment of an instance 300, of the file access information 300, including a client identifier 302 identifying the client 112 from which the file request originated; an application 304 that submitted the request; a file identifier 306 of the file to which the request is directed; a file size 308; total bytes read 310 from the file; and bytes read in a current time slice 312 that started at a current slice start time 314. The bytes read in the current time slice 312 divided by the difference of the current slice start time 314 and a current time can determine a current read access rate for the application 304 accessing the file 306.

Figure 4:
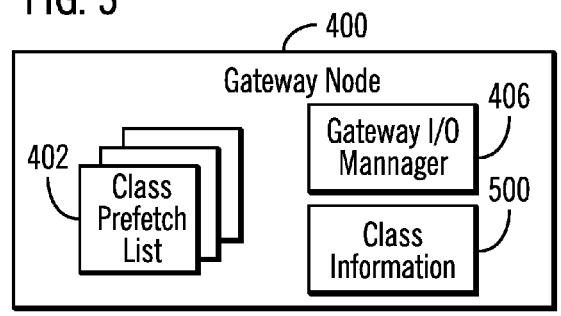
FIG. 4 illustrates an embodiment of a gateway node.

FIG. 4 illustrates an embodiment of components in a gateway node 400, such as one of gateway nodes $400a_1$, $400a_2$, $400b_1$, $400b_2$ as including class information 500 having information on the customer classes; class prefetch lists 402 providing lists for one or more classes, where each class list 402 has a list of prefetch requests to prefetch data for files in the remote storage 104b to prefetch and cache at the local storage 104a; and a gateway I/O manager 406 to manage remote requests over the network 106. The local gateway I/O manager 406 at one of the local gateway nodes $400a_1$, $400a_2$ communicates with the remote gateway I/O manager 406 at the remote gateway nodes $400b_1$, $400b_2$ to access data from the remote storage 104b to cache at the local storage 104b and to handle prefetch requests to prefetch data for files accessed through the application nodes $200a_1$, $200a_2$, $200b_1$, $200b_2$.

Figure 5:
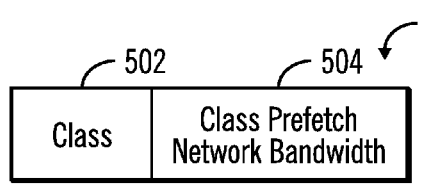
FIG. 5 illustrates an embodiment of a class information instance.

FIG. 5 illustrates an embodiment of an instance 500, of the class information 500 for one class, including a class 502, e.g., gold, silver, bronze, etc., and a class prefetch network bandwidth 504 indicating an amount of network 106 bandwidth to allocate to prefetch operations for the class 502. The class prefetch network bandwidth 504 may comprise an absolute amount of network bandwidth, e.g., Mb or Gb per second, assigned to the class, or comprise a percentage of the prefetch network bandwidth to be allocated to the class 502. For instance, if 50% of total network bandwidth is to be allocated for prefetch requests, then the prefetch network bandwidth 504 for a particular class may be determined by multiplying the overall available network 106 bandwidth allocated for prefetch requests times the allocation for the particular class, resulting in the class prefetch network bandwidth 504. In this way, customers can purchase different QoS levels to receive a higher allocation of network bandwidth for their application prefetch requests.

Figure 6:
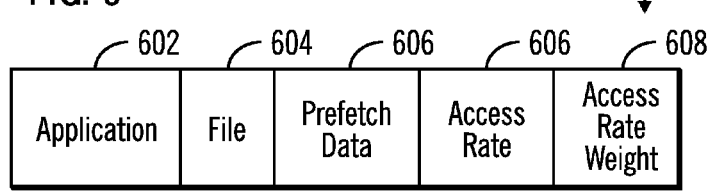
FIG. 6 illustrates an embodiment of a prefetch request.

FIG. 6 illustrates an embodiment of a prefetch request 600 indicating an application 602; a file 604 whose access by the application 602 resulted in the prefetch request; prefetch data 606 to prefetch for expected future accesses by the application 602 of the file 604, which may indicate a location in the remote storage 104b and amount of data to prefetch; an access rate 606 at which the application 602 is accessing data from the file 604; and an access rate weight 608 calculated based on the access rate 606.

Figure 7:
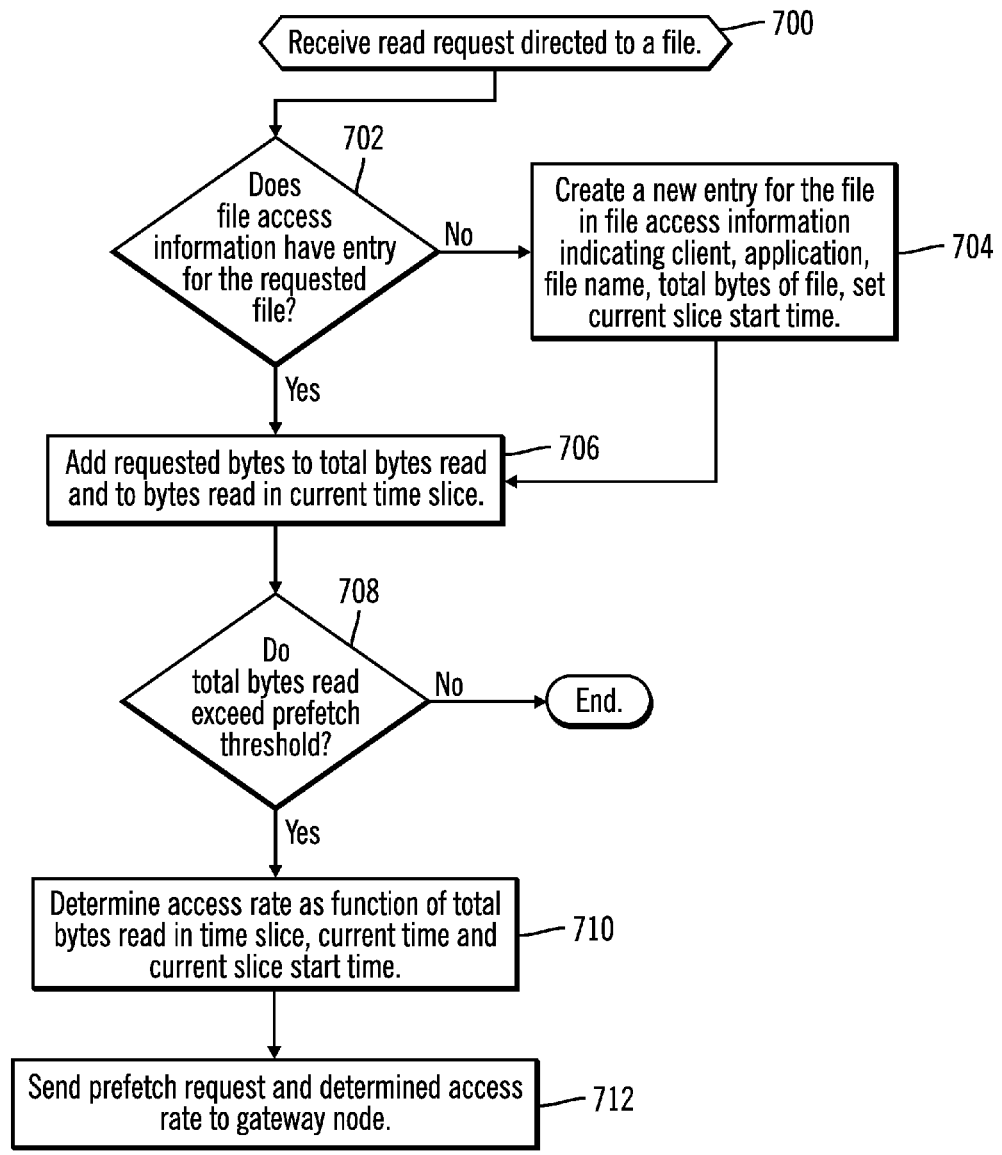
FIG. 7 illustrates an embodiment of operations to process a read request.

FIG. 7 illustrates an embodiment of operations performed by the application I/O manager 204 at the local application nodes $200a_1$, $200a_2$ to process a read request from an application 114. Upon receiving (at block 700) a read request, if (at block 702) the file access information 300 does not have an entry 300, for the requested file, e.g., with the file ID 306, then the application I/O manager 204 creates (at block 704) a new entry 300, for the file in file access information 300 indicating the client 302, application 304, file name 306, total bytes of file 308, and setting a current slice start time 314 to the current time. From block 704 or if (from the yes branch at block 702) there is an entry 300, for the file subject to the read request, then the application I/O manager 204 adds (at block 706) the requested bytes to read in the read request to the total bytes read 310 and adds the requested bytes to the bytes read in current time slice 312.

If (at block 708) the updated total bytes read 310 exceeds a prefetch threshold, which may comprise a system default value or an administrator set value, then the application I/O manager 204 determines (at block 710) the access rate for the application access of the file as a function of the bytes read in the current time slice 312, a current system time (e.g., system time), and the current slice start time 314. In one embodiment, the access rate may comprise the total bytes read in current time sliced 312 divided by the difference of a current time and the current slice start time 314. The application I/O manager 204 sends (at block 712) a prefetch request for the file and indicates the application, file, and the determined access rate for the application 114 accessing the file. If (at block 706) the total bytes read 310 does not exceed the prefetch threshold, then control ends because not enough data for the file 306 has yet been read to trigger a prefetch request.

Figure 8:
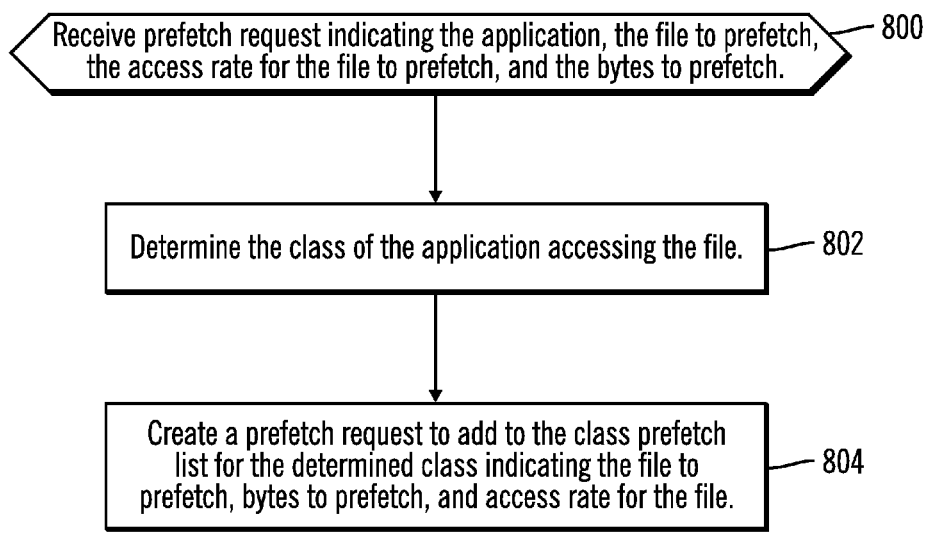
FIG. 8 illustrates an embodiment of operations to process a received prefetch request.

FIG. 8 illustrates an embodiment of operations performed by the gateway I/O manager 406 at the local gateway node $400a_1$, $400a_2$ to process a prefetch request received from a local application node $200a_1$, $200a_2$. Upon receiving (at block 800) a prefetch request indicating the application 114, the file to prefetch, and the access rate of the application accessing the file to prefetch, the gateway I/O manager 406 determines (at block 802) the class of the application 114 accessing the file resulting in the prefetch operation and creates (at block 804) a prefetch request 600 to add to the class prefetch list 402 for the determined class of the application 114, indicating the application 602, the file 604 to prefetch, the data to prefetch 606, and the access rate 606.

Figure 9:
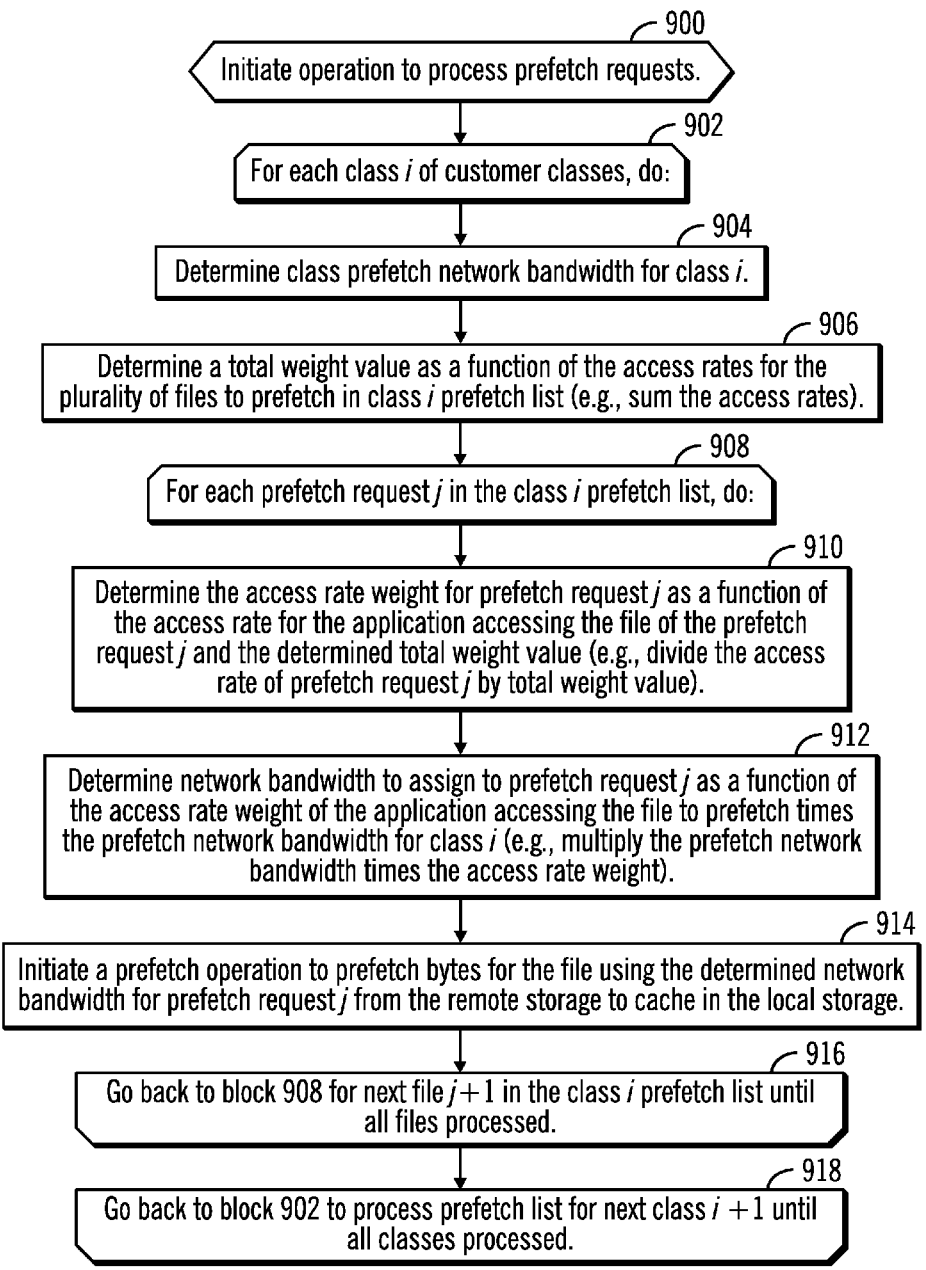
FIG. 9 illustrates an embodiment of operations to process prefetch requests.

FIG. 9 illustrates an embodiment of operations performed by the gateway I/O manager 406 at the local gateway node $400a_1$, $400a_2$ to process prefetch requests in the class prefetch lists 402, which may be performed periodically or in response to certain events. Upon initiating (at block 900) an operation to process prefetch requests, a loop of operations is performed at blocks 902 through 918 for each class i for which there is a class prefetch list 402 of prefetch requests 600 to process. At block 904, the gateway I/O manager 406 determines (at block 904) the class prefetch network bandwidth 504 for class i. A total weight value is determined (at block 906) as a function of the access rates 606 for the plurality of files to prefetch indicated in the prefetch requests 600 in the class i prefetch list 402. In one embodiment, the total weight value may comprise the sum of the access rates 606 for the prefetch requests in the class i prefetch list 402.

At blocks 908 through 916, the gateway I/O manager 402 performs a loop of operations for each prefetch request $600_j$ in the class i prefetch list 402. At block 910, the gateway I/O manager 402 determines the access rate weight $608_j$ for prefetch request j as a function of the access rate $606_j$ for the prefetch request $600_j$ and the determined total weight value. In one embodiment, the access rate weight $608_j$ may be calculated by dividing the access rate $606_j$ for prefetch request $600_j$ by the total weight value. The gateway I/O manager 402 determines (at block 912) the network bandwidth to assign to prefetch request $600_j$ as a function of the access rate weight $608_j$ of the application accessing the file to prefetch times the prefetch network bandwidth for class i. The gateway I/O manager 402 initiates (at block 914) a prefetch operation to prefetch the bytes for the file using the determined network bandwidth for prefetch request $600_j$ from the remote storage 104b to cache in the local storage 104a.

In the described embodiments, the application node 200 maintains the file access information 300 and generates the prefetch requests to the gateway node 400. In an alternative embodiment, the gateway node 400 may maintain the client access information 300, and the application node 200 forwards the client 112 and application 114 identifiers along with the read request for the gateway node 400 to process and perform the operations of FIG. 7.

Described embodiments provide techniques to determine an amount of network bandwidth to allocate to a prefetch request based on the application access rate of the file having the data to prefetch. With described embodiments, the determined prefetch network bandwidth may be based on a customer class of the application whose read access resulted in the prefetch request. In this way, prefetch requests for a file being accessed by an application at a higher access rate may be assigned a relatively higher prefetch network bandwidth for the prefetch request than for prefetch requests for files being accessed at a lower access rate by applications. Further, prefetch requests for a file being accessed by an application assigned a higher customer class may be assigned a relatively higher prefetch network bandwidth for the prefetch request than for prefetch requests for files being accessed by applications assigned to a lower customer class.

Figure 10:
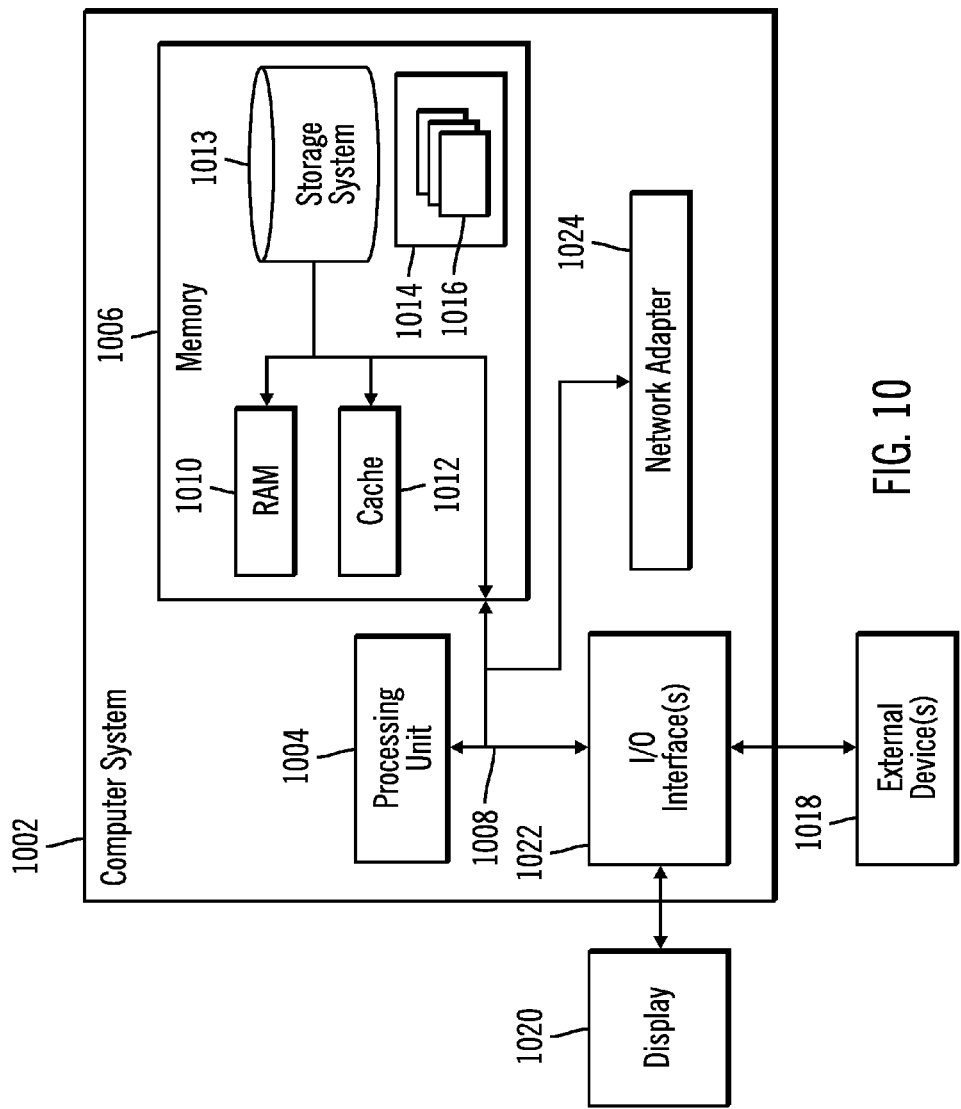
FIG. 10 illustrates an embodiment of a computing environment in which the components of FIGS. 1, 2, and 4 may be implemented.

FIG. 10 provides a schematic of an example of a computer system 1002, such as may be used to implement one or more of the application 200 and gateway 400 nodes. Computer system 1002 is only one example of a suitable computing node and is not intended to suggest any limitation as to the scope of use or functionality of embodiments of the invention described herein. Regardless, computer system 1002 is capable of being implemented and/or performing any of the functionality set forth hereinabove.

Computer system 1002 is operational with numerous other general purpose or special purpose computing system environments or configurations. Examples of well-known computing systems, environments, and/or configurations that may be suitable for use with computer system/server 1002 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1002 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1002 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 1002 in cloud computing node 10 is shown in the form of a general-purpose computing device. The components of computer system/server 1002 may include, but are not limited to, one or more processors or processing units 1004, a system memory 1006, and a bus 1008 that couples various system components including system memory 1006 to processor 1004.

Bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 1002 typically includes a variety of computer system readable media. Such media may be any available media that is accessible by computer system/server 1002, and it includes both volatile and non-volatile media, removable and non-removable media.

System memory 1006 can include computer system readable media in the form of volatile memory, such as random access memory (RAM) 1010 and/or cache memory 1012. Computer system/server 1002 may further include other removable/non-removable, volatile/non-volatile computer system storage media. By way of example only, storage system 1013 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1008 by one or more data media interfaces. As will be further depicted and described below, memory 1006 may include at least one program product having a set (e.g., at least one) of program modules that are configured to carry out the functions of embodiments of the invention.

Program/utility 1014, having a set (at least one) of program modules 1016, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. Program modules 1016 generally carry out the functions and/or methodologies of embodiments of the invention as described herein.

Computer system/server 1002 may also communicate with one or more external devices 1018 such as a keyboard, a pointing device, a display 1020, etc.; one or more devices that enable a user to interact with computer system/server 1002; and/or any devices (e.g., network card, modem, etc.) that enable computer system/server 1002 to communicate with one or more other computing devices. Such communication can occur via Input/Output (I/O) interfaces 1022. Still yet, computer system/server 1002 can communicate with one or more networks such as a local area network (LAN), a general wide area network (WAN), and/or a public network (e.g., the Internet) via network adapter 1024. As depicted, network adapter 1024 communicates with the other components of computer system/server 1002 via bus 1008. It should be understood that although not shown, other hardware and/or software components could be used in conjunction with computer system/server 1002. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for accessing data from a remote storage to store in a local storage, the computer program product comprising a non-transitory computer readable storage medium having computer readable program code embodied therein that when executed performs operations, the operations comprising:
   receiving a request to access a requested file by an indicated application;
   determining an access rate for the indicated application accessing the requested file, wherein the access rate is based on a rate of the indicated application access of data in the requested file over a period of time;
   determining a sum of access rates for a plurality of files including files other than the requested file;
   determining an access rate weight based on the determined access rate for the requested file and the sum of access rates of the plurality of files; and
   using the determined access rate weight for each of the files to determine network bandwidth to assign to prefetch data for the indicated application accessing the requested file from the remote storage to store in the local storage.

2. The computer program product of claim 1, wherein the plurality of files comprises files for which data is to be prefetched from the remote storage to cache at the local storage for future expected read accesses to the data in the files, wherein the operations further comprise:
   initiating a prefetch for each of the files using the determined network bandwidth assigned to the file.

3. The computer program product of claim 2, wherein determining the network bandwidth to assign comprises:
   determining a prefetch network bandwidth allocated to prefetch requests, wherein the determining the network bandwidth comprises determining the network bandwidth to assign to prefetch data for each of the files as a function of the determined access rate weight of the file and the prefetch network bandwidth.

4. The computer program product of claim 3, wherein the operations further comprise:
   maintaining different prefetch network bandwidths for customer classes, wherein applications accessing files are associated with the customer classes, and wherein the prefetch network bandwidth used to determine the network bandwidth to assign to prefetch data for each of the files comprises the prefetch network bandwidth for the customer class of an application accessing the file.

5. The computer program product of claim 1, wherein the determining the access rate weight comprises:
   determining a total weight value from the access rates for a plurality of applications accessing the plurality of files; and
   determining the access rate weight for each file of the plurality of files being accessed as a function of the access rate of the application of the plurality of applications accessing the file and the determined total weight value.

6. The computer program product of claim 1, wherein the operations further comprise:
  receiving, from a plurality of applications, read requests directed to the files;
  maintaining file information for each of the files indicating total bytes read and bytes read in a time period;
  determining for each of the files whether the total bytes read exceeds a prefetch threshold; and
  generating a prefetch request for the file determined to have the total bytes read exceed the prefetch threshold, wherein the determining the access rate, the determining the access rate weight, and the determining the network bandwidth to assign is performed for the file for which the prefetch request was generated, and wherein the access rate for the file is determined from the indicated bytes read for the time period indicated in the maintained file information for the file.

7. The computer program product of claim 6, further comprising:
  an application node performing the receiving the read requests for the files, the maintaining the file information for the files for which read data is requested, the determining whether the prefetch threshold is exceeded, and the generating the prefetch request; and
  a gateway node, wherein the application node forwards the prefetch request to the gateway node with the access rate, and wherein the gateway node performs the using the determined access rate weight for each of the files to determine network bandwidth to assign to prefetch data for the files, and wherein the gateway node initiates an operation to access data for the file from the remote storage to cache at the local storage for the forwarded prefetch request.

8. The computer program product of claim 6, further comprising:
  an application node for performing receiving the read requests for the files; and
  a gateway node receiving the read requests for the files from the application node, wherein the gateway node performs the maintaining the file information for the files for the read request, the determining whether the prefetch threshold is exceeded, the generating the prefetch request, the using the determined access rate weight for each of the files to determine network bandwidth to assign to prefetch data for the files, and wherein the gateway node initiates an operation to access data for the file from the remote storage to cache at the local storage for the generated prefetch request.

9. A system for accessing data from a remote storage to store in a local storage, comprising:
  a processor; and
  a computer readable storage medium including computer readable program code that when executed by the processor performs operations, the operations comprising:
    receiving a request to access a requested file by an indicated application;
    determining an access rate for the indicated application accessing the requested file, wherein the access rate is based on a rate the indicated application accesses data in of the requested file over a period of time;
    determining a sum of access rates for a plurality of files including files other than the requested file;
    determining an access rate weight based on the determined access rate for the requested file and the sum of access rates of the plurality of files; and
    using the determined access rate weight for each of the files to determine network bandwidth to assign prefetch data for the indicated application accessing the requested file from the remote storage to store in the local storage.

10. The system of claim 9, wherein the plurality of files comprises files for which data is to be prefetched from the remote storage to cache at the local storage for future expected read accesses to the data in the files, wherein the operations further comprise:
  initiating a prefetch for each of the files using the determined network bandwidth assigned to the file.

11. The system of claim 10, wherein determining the network bandwidth to assign comprises:
  determining a prefetch network bandwidth allocated to prefetch requests, wherein the determining the network bandwidth comprises determining the network bandwidth to assign to prefetch data for each of the files as a function of the determined access rate weight of the file and the prefetch network bandwidth.

12. The system of claim 11, wherein the operations further comprise:
  maintaining different prefetch network bandwidths for customer classes, wherein accessing files are associated with the customer classes, and wherein the prefetch network bandwidth used to determine the network bandwidth to assign to prefetch data for each of the files comprises the prefetch network bandwidth for the customer class of an application accessing the file.

13. The system of claim 9, wherein the determining the access rate weight comprises:
  determining a total weight value from the access rates for a plurality of applications accessing the plurality of files; and
  determining the access rate weight for each file of the plurality of files being accessed as a function of the access rate of the application of the plurality of applications accessing the file and the determined total weight value.

14. The system of claim 9, wherein the operations further comprise:
  receiving, from a plurality of applications, read requests directed to the files;
  maintaining file information for each of the files indicating total bytes read and bytes read in a time period;
  determining for each of the files whether the total bytes read exceeds a prefetch threshold; and
  generating a prefetch request for the file determined to have the total bytes read exceed the prefetch threshold, wherein the determining the access rate, the determining the access rate weight, and the determining the network bandwidth to assign is performed for the file for which the prefetch request was generated, and wherein the access rate for the file is determined from the indicated bytes read for the time period indicated in the maintained file information for the file.

15. A computer method for accessing data from a remote storage to store in a local storage, comprising:
  receiving a request to access a requested file by an indicated application;
  determining an access rate for the indicated application accessing the requested file, wherein the access rate is based on a rate of the indicated application access of data in the requested file over a period of time;
  determining a sum of access rates for a plurality of files including files other than the requested file;

determining an access rate weight based on the determined access rate for the requested file and the sum of access rates of the plurality of files; and using the determined access rate weight for each of the files to determine network bandwidth to assign to prefetch data for the indicated application accessing the requested file from the remote storage to store in the local storage.

16. The method of claim 15, wherein the plurality of files comprises files for which data is to be prefetched from the remote storage to cache at the local storage for future expected read accesses to the data in the files, further comprising:

initiating a prefetch for each of the files using the determined network bandwidth assigned to the file.

17. The method of claim 16, wherein determining the network bandwidth to assign comprises:

determining a prefetch network bandwidth allocated to prefetch requests, wherein the determining the network bandwidth comprises determining the network bandwidth to assign to prefetch data for each of the files as a function of the determined access rate weight of the file and the prefetch network bandwidth.

18. The method of claim 17, further comprising:

maintaining different prefetch network bandwidths for customer classes, wherein applications accessing files are associated with the customer classes, and wherein the prefetch network bandwidth used to determine the network bandwidth to assign to prefetch data for each of the files comprises the prefetch network bandwidth for the customer class of an application accessing the file.

19. The method of claim 15, wherein the determining the access rate weight comprises:

determining a total weight value from the access rates for a plurality of applications accessing the plurality of files; and determining the access rate weight for each file of the plurality of files being accessed as a function of the access rate of the application of the plurality of applications accessing the file and the determined total weight value.

20. The method of claim 15, further comprising:

receiving, from a plurality of applications, read requests directed to the files;

maintaining file information for each of the files indicating total bytes read and bytes read in a time period;

determining for each of the files whether the total bytes read exceeds a prefetch threshold; and generating a prefetch request for the file determined to have the total bytes read exceed the prefetch threshold, wherein the determining the access rate, the determining the access rate weight, and the determining the network bandwidth to assign is performed for the file for which the prefetch request was generated, and wherein the access rate for the file is determined from the indicated bytes read for the time period indicated in the maintained file information for the file.

21. The computer program product of claim 1, wherein the plurality of files used to determine the sum of access rates are assigned to a customer class of customers assigned to access the files, and wherein the network bandwidth to assign to prefetch the data is further based on a network bandwidth assigned to the customer class of the plurality of files.

22. The system of claim 9, wherein the plurality of files used to determine the sum of access rates are assigned to a customer class of customers assigned to access the files, and wherein the network bandwidth to assign to prefetch the data is further based on a network bandwidth assigned to the customer class of the plurality of files.

23. The method of claim 15, wherein the plurality of files used to determine the sum of access rates are assigned to a customer class of customers assigned to access the files, and wherein the network bandwidth to assign to prefetch the data is further based on a network bandwidth assigned to the customer class of the plurality of files.

* * * * *